US011865957B1

(12) United States Patent
Nayak et al.

(10) Patent No.: US 11,865,957 B1
(45) Date of Patent: Jan. 9, 2024

(54) INTER-CONNECTED TETHERS AT REAR OF SEATBACK FOAM FOR OCCUPANT THORACIC PROTECTION

(71) Applicant: GM Global Technology Operations LLC, Detroit, MI (US)

(72) Inventors: Ashish Nayak, Bhopal (IN); Chin-hsu Lin, Troy, MI (US); Prashant Kohakade, Maharashtra (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/814,305

(22) Filed: Jul. 22, 2022

(51) Int. Cl.
*B60N 2/70* (2006.01)
*B60N 2/809* (2018.01)
*B60N 2/64* (2006.01)
*B60N 2/72* (2006.01)
*B60R 22/34* (2006.01)

(52) U.S. Cl.
CPC .............. *B60N 2/7011* (2013.01); *B60N 2/64* (2013.01); *B60N 2/72* (2013.01); *B60N 2/809* (2018.02); *B60R 22/34* (2013.01)

(58) Field of Classification Search
CPC ...... B60N 2/7011; B60N 2/7076; B60N 2/64; B60N 2/809; A47C 7/22
See application file for complete search history.

(56) References Cited

U.S. PATENT DOCUMENTS

| | | | | |
|---|---|---|---|---|
| 3,258,259 A | * | 6/1966 | Nils ........................ | A47C 7/22 267/89 |
| 5,927,804 A | * | 7/1999 | Cuevas ................. | B60N 2/888 297/216.12 |
| 6,921,132 B2 | * | 7/2005 | Fujita ....................... | B60N 2/70 297/452.56 |
| 7,396,079 B2 | * | 7/2008 | Heidmann ............... | A47C 7/46 297/285 |
| 8,267,471 B2 | * | 9/2012 | Reel ..................... | B60N 2/4228 297/216.13 |
| 9,560,916 B1 | * | 2/2017 | Bullard .................... | A47C 7/28 |
| 10,669,030 B1 | * | 6/2020 | Morse ...................... | B60N 2/66 |
| 11,618,354 B2 | * | 4/2023 | Glaub ................... | B60N 2/502 297/216.1 |
| 2004/0232743 A1 | * | 11/2004 | Fujita ................... | B60N 2/7011 297/216.1 |
| 2015/0108820 A1 | * | 4/2015 | Fujita ...................... | B60N 2/70 297/452.48 |
| 2015/0137576 A1 | * | 5/2015 | Bullard .................... | A47C 3/00 297/452.18 |
| 2017/0354259 A1 | * | 12/2017 | Gale ........................ | A47C 7/22 |
| 2018/0236967 A1 | * | 8/2018 | Jaradi .................... | B60N 2/688 |
| 2020/0122616 A1 | * | 4/2020 | Nageshkar ........... | B60N 2/7011 |
| 2021/0045535 A1 | * | 2/2021 | Wilcox .................. | A47C 7/624 |

FOREIGN PATENT DOCUMENTS

| | | | | | |
|---|---|---|---|---|---|
| CN | 114475380 A | * | 5/2022 | ............... | A47C 4/30 |
| DE | 102018209438 A1 | * | 12/2019 | ............... | B60N 2/02 |
| GB | 2569289 A | * | 6/2019 | ............... | A47C 7/22 |

* cited by examiner

*Primary Examiner* — Timothy J Brindley
(74) *Attorney, Agent, or Firm* — Vivacqua Crane PLLC

(57) ABSTRACT

A vehicle seat inter-connected tether assembly includes a first tether, a second tether and a vertically configured third tether positioned between the first tether and the second tether fixedly coupled to and connecting the first tether to the second tether. A connector positioned at distal ends of the first tether and the second tether is configured to couple the first tether and the second tether to opposed seat frame members of a vehicle seat frame.

7 Claims, 3 Drawing Sheets

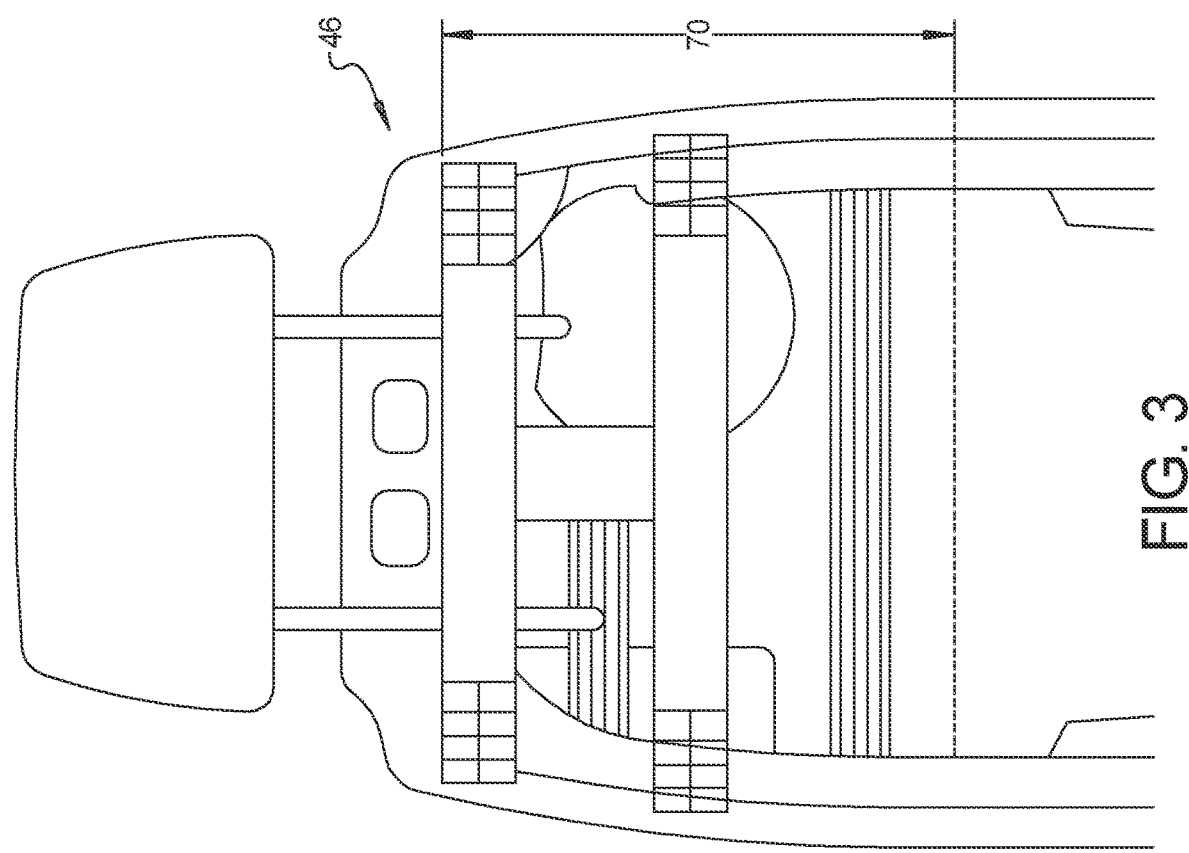

INTER-CONNECTED TETHERS AT REAR OF SEATBACK FOAM FOR OCCUPANT THORACIC PROTECTION

INTRODUCTION

The present disclosure relates to vehicle seat restraint systems and components.

In known vehicle seat configurations, a restraint package is normally provided to pre-tighten occupant seat belts during an impact event. The restraint package is commonly positioned behind an occupant and in front of seat head rest rods or other packaging. Seat cushions upon which an occupant is seated assist in restricting this rearward motion of the occupant.

While current vehicle restraint and seating systems achieve their intended purpose, there is a need for a new and improved vehicle restraint and seating system.

SUMMARY

According to several aspects, a vehicle seat inter-connected tether assembly includes a first tether, a second tether and a vertically configured third tether positioned between the first tether and the second tether fixedly coupled to and connecting the first tether to the second tether. A connector positioned at distal ends of the first tether and the second tether is configured to couple the first tether and the second tether to opposed seat frame members of a vehicle seat frame.

In another aspect of the present disclosure, the third tether includes a first connecting end fixing the first tether to the third tether, and a second connecting end fixing the third tether to the second tether, with the third tether oriented substantially vertically.

In another aspect of the present disclosure, the first connecting end and the second connecting end individually define a sewn seam.

In another aspect of the present disclosure, the first connecting end and the second connecting end define a mechanical connector.

In another aspect of the present disclosure, the first tether and the second tether are oriented parallel to each other.

In another aspect of the present disclosure, the first tether and the second tether are horizontally configured.

In another aspect of the present disclosure, a polymeric seat belt material is used to construct the first tether, the second tether and the third tether.

In another aspect of the present disclosure, the first tether, the second tether and the third tether have a width of approximately 2 inches (5.1 cm).

In another aspect of the present disclosure, a first tether first connector is fixed to a first end of the first tether and a first tether second connector is fixed to a second end of the first tether individually defining a looped and sewn end looped around individual ones of the opposed seat frame members of the vehicle seat frame. A second tether first connector is fixed to a first end of the second tether and a second tether second connector is fixed to a second end of the second tether individually defining a looped and sewn end looped around the individual ones of the opposed seat frame members of the vehicle seat frame.

In another aspect of the present disclosure, a tether retractor tensions the first tether and the second tether.

According to several aspects, a vehicle seat assembly includes a vehicle seat including a seat frame supporting a seat back. A tether assembly includes a first tether having a first tether first connector and a first tether second connector, a second tether having a second tether first connector and a second tether second connector, and a vertically configured third tether positioned between the first tether and the second tether fixedly coupled to and connecting the first tether to the second tether. The seat back includes a first one and a second one of opposed seat frame members. The first tether first connector and the second tether first connector together are fixed to the first one of the opposed seat frame members of the seat back, and the first tether second connector and the second tether second connector together are fixed to the second one of the opposed seat frame members of the seat back.

In another aspect of the present disclosure, a headrest connected to the seat back has a first headrest post and a second headrest post allowing upward and downward motion of the headrest. The headrest, the first headrest post and the second headrest post are positioned rearward of the tether assembly.

In another aspect of the present disclosure, a seatbelt includes a seatbelt retractor providing tension adjustment for the seatbelt, wherein the seatbelt retractor is positioned rearward of the tether assembly.

In another aspect of the present disclosure, a tether retractor tensions the first tether and the second tether. The tether retractor is positioned rearward of the tether assembly.

In another aspect of the present disclosure, a seat back foam member is provided, the seat back foam member together with the tether assembly being positioned between a thoracic region of an occupant of the vehicle seat and the seatbelt retractor, the first headrest post, the second headrest post, and the tether retractor.

In another aspect of the present disclosure, the first tether first connector is fixed to a first end of the first tether and the first tether second connector is fixed to a second end of the first tether. The second tether first connector is fixed to a first end of the second tether and the second tether second connector is fixed to a second end of the second tether.

In another aspect of the present disclosure, the first tether first connector and the second tether first connector individually define a sewn looped end fixed by looping around the first one of the opposed seat frame members of the seat back, and the first tether second connector and the second tether second connector individually define a sewn looped end fixed by looping around the second one of the opposed seat frame members of the seat back.

According to several aspects, a method to provide thoracic region support for an occupant of a vehicle seat, comprises: creating a tether assembly having a first tether oriented substantially parallel to a second tether, and a third tether vertically positioned between the first tether and the second tether fixedly coupling the first tether to the second tether fixedly coupling a first tether first connector and a second tether first connector to a first one of opposed seat frame members of a vehicle seat back, and a first tether second connector and a second tether second connector to a second one of the opposed seat frame members of the vehicle seat back; and positioning a seat back foam member together with the tether assembly between a thoracic region of an occupant of the vehicle seat and individual ones of a seatbelt retractor and a tether retractor.

In another aspect of the present disclosure, the method further includes: connecting a headrest to the seat back having a first headrest post and a second headrest post allowing upward and downward motion of the headrest; and positioning the headrest, the first headrest post and the second headrest post rearward of the tether assembly.

In another aspect of the present disclosure, the method further includes: fixing the first tether to the third tether using a first connecting end of the third tether; and coupling the second tether to the third tether using a second connecting end of the third tether.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a front elevational view looking rearward modified from FIG. 2 to further indicate a dimensional position range for the inter-connected tether assembly of the present disclosure.

DETAILED DESCRIPTION

The following description is merely exemplary in nature and is not intended to limit the present disclosure, application, or uses.

Figure 1:
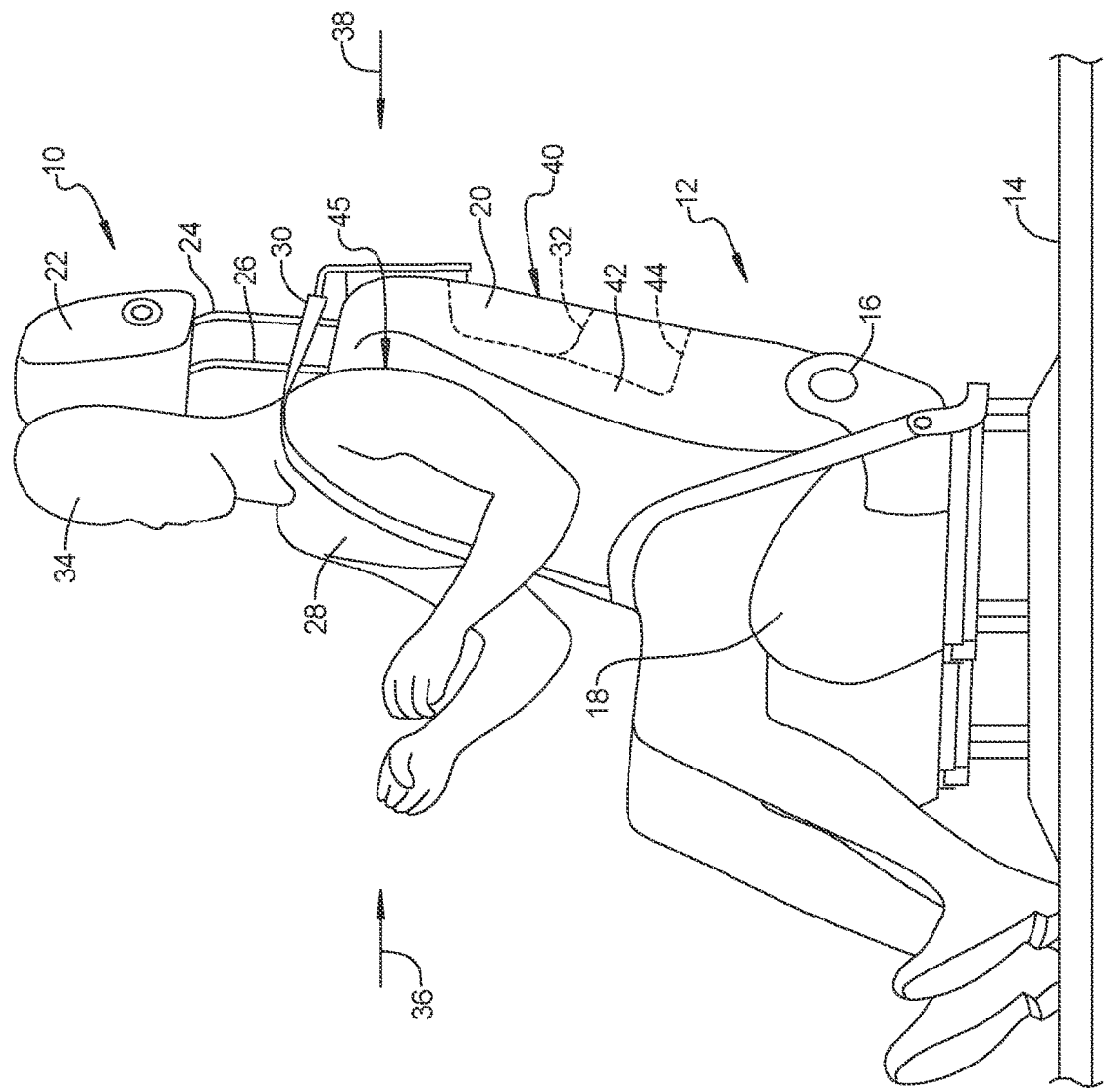
FIG. 1 is a front left perspective view looking rearward of an occupant seated in a vehicle seat providing a system and method of interconnected tethers at a rear of seatback foam for occupant thoracic protections according to an exemplary aspect.

Referring to FIG. 1, an occupant thoracic protection system 10 includes a vehicle seat 12 connected to an vehicle 14 such as an automobile, a sport utility vehicle, a pickup truck, a van, and the like, only partially shown for clarity. A seat frame 16 supports a seat base 18 and a seat back 20. An adjustable height headrest 22 is connected to the seat back 20 having a first headrest post 24 and a second headrest post 26 allowing upward and downward motion of the headrest 22. An occupant 28 seated on the vehicle seat 12 is restrained during a vehicle collision event by a seatbelt 30 such as a 3-point seatbelt which includes a seatbelt retractor 32 providing tension adjustment for the seatbelt 30 during the collision event. The headrest 22 restricts acceleration and displacement of a head 34 of the occupant 28 in a rearward direction 36. During a rear impact event the vehicle 14 is accelerated in a forward direction 38 together with the vehicle seat 12. The occupant 28 is also pushed forward by the movement of the vehicle seat 12. A relative motion of the occupant 28 also results during the rear collision event wherein the occupant 28 moves in the rearward direction 36 into the vehicle seat 12 as the vehicle seat 12 initially moves forward.

Figure 2:
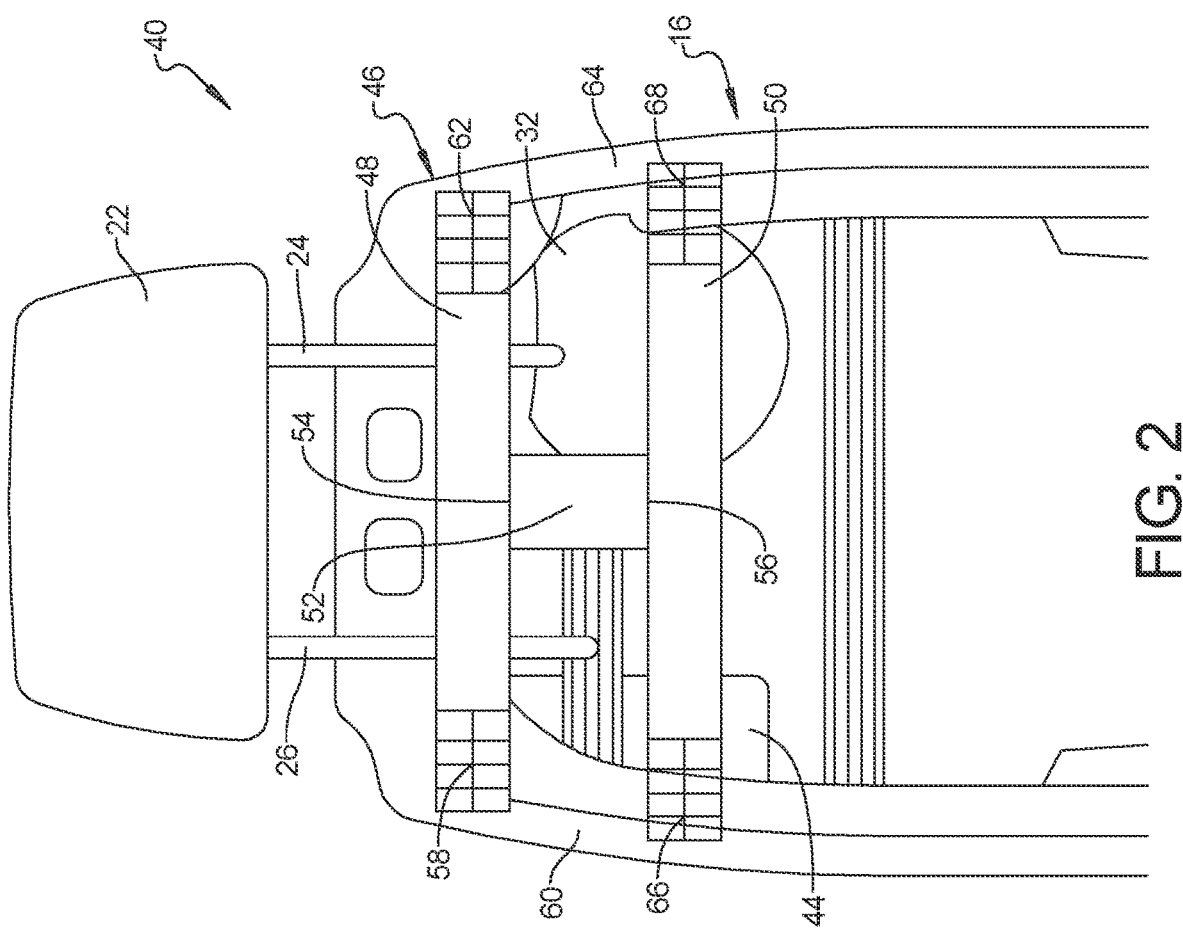
FIG. 2 is a front elevational view looking rearward of the vehicle seat of FIG. 1 having seat foam and cushions removed for clarity.

According to several aspects the occupant thoracic protection system 10 also includes an inter-connected tether assembly 40 positioned rearward of a seat back foam member 42 of the seat back 20, shown and described in greater detail in reference to FIG. 2. A tether retractor 44 is also positioned rearward of the seat back foam member 42 of the seat back 20 connected to the first tether 48 and the second tether 50 which provides for pre-collision and collision event tensioning of the tethers of the inter-connected tether assembly 40 also shown and described in greater detail in reference to FIG. 2. A thoracic region 45 of the occupant 28 contacts the seat back 20 in a normal seated position of the occupant 28.

Referring to FIG. 2 and again to FIG. 1, the inter-connected tether assembly 40 includes a tether assembly 46 having a horizontally configured first tether 48, a horizontally configured second tether 50 and a third tether 52 positioned between the first tether 48 and the second tether 50 which is vertically configured in an upward-downward orientation and fixedly coupled to the first tether 48 and the second tether 50. According to several aspects the first tether 48 and the second tether 50 are oriented parallel to each other or may in other aspects be oriented angularly to each other. The third tether 52 includes a first connecting end 54 such as a sewn seam or a mechanical connector fixing the first tether 48 to the third tether 52, and a second connecting end 56 such as a sewn seam or a mechanical connector fixing the third tether 52 to the second tether 50. The first tether 48 and the second tether 50 also include a connector at distal ends of the tethers described below to fixedly couple the first tether 48 and the second tether 50 to opposed seat frame members of the seat frame 16.

According to several aspects, a first tether first connector 58 fixed to a first end of the first tether 48 defines a sewn looped end of the horizontally configured first tether 48 looped around a seatback frame first member 60, or defines a wrapping, a mechanical connection or the like fixed to the seatback frame first member 60. A second tether second connector 62 fixed to a second end of the first tether 48 defines a sewn looped end of the horizontally configured first tether 48 looped around a seatback frame second member 64, or defines a wrapping, a mechanical connection or the like fixed to the seatback frame second member 64. Similarly, a second tether first connector 66 fixed to a first end of the second tether 50 defines a sewn looped end of the horizontally configured second tether 50 looped around the seatback frame first member 60, or defines a wrapping, a mechanical connection or the like fixed to the seatback frame first member 60. A second tether second connector 68 fixed to a second end of the second tether 50 defines a sewn looped end of the horizontally configured second tether 50 looped around the seatback frame second member 64, or defines a wrapping, a mechanical connection or the like fixed to the seatback frame second member 64.

The inter-connected tether assembly 40 is positioned forward of the seatbelt retractor 32, forward of the first headrest post 24 and the second headrest post 26, and forward of the tether retractor 44. With continuing reference to FIG. 1, the seat back foam member 42 together with the inter-connected tether assembly 40 are therefore positioned between the thoracic region 45 of the occupant 28 and objects including the seatbelt retractor 32, the first headrest post 24, the second headrest post 26, and the tether retractor 44. The inter-connected tether assembly 40 thereby provides additional support for the thoracic region 45 as the occupant displaces rearwardly in the rearward direction 36.

The tethers of the inter-connected tether assembly 40 are inter-connected and attached to the seatback frame first member 60 and the seatback frame second member 64 of the seat frame 16 and are used to uniformly distribute a load in a rear impact event to a posterior chest defining the thoracic region 45 of the seat occupant 28. The tethers of the inter-connected tether assembly 40 may be uniformly or non-uniformly compressed during the rear impact event, therefore the loads on the tethers will straighten the tethers and distribute the load from one side to an opposite side of the seat frame 16 such that the impact force may be uniformly distributed. The tethers of the inter-connected tether assembly 40 as noted herein may also be pre-tightened ahead of an imminent impact to provide additional support if needed. Fabric or polymeric seat belt material may be selected to construct the tethers of the inter-connected tether assembly 40. Other materials may also be used including knit fabrics, woven fabrics, elastomer bands, and the like.

Referring to FIG. 3 and again to FIGS. 1 and 2, a range of elevation locations 70 for the inter-connected tether assembly 40 positioned on the seat frame 16 may vary depending on seat belt hardware, seatbelt retractor 32, tether retractor 44 and headrest component positioning on the seat back 20. The inter-connected tether assembly 40 does not compress the seat back foam member 42 in a normal driving condition and therefore does not reduce a comfort level to the occupant 28 provided by the seat back foam member 42, while adding safety protection during the rear impact event.

An inter-connected tether assembly 40 of the present disclosure enhances occupant clearance to the seatbelt retractor 32 and the tether retractor 44 normally provided to pre-tighten occupant seat belts and the tethers of the inter-connected tether assembly 40 during the impact event commonly positioned behind the occupant 28 in front of the seat head rest rods or other packaging where it may be impacted by a rearward motion of the occupant 28. Therefore the inter-connected tether assembly 40 is positioned forward of the seatbelt retractor 32 and the tether retractor 44.

An inter-connected tether assembly 40 of the present disclosure offers several advantages. These include the inter-connected tether assembly 40 absorbing a portion of the force induced by occupant motion, reducing rearward motion of the occupant 28 to mitigate against the occupant thoracic region 45 striking the seatbelt retractor 32 or the tether retractor 44, and distributing the occupant motion force from one of the seatback side frame members to an opposite one of the seatback side frame members.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to provide thoracic region support for an occupant of a vehicle seat, comprising:

creating a tether assembly having a first tether oriented substantially parallel to a second tether, and a third tether vertically positioned between the first tether and the second tether fixedly coupling the first tether to the second tether;

fixedly coupling a first tether first connector and a second tether first connector to a first one of a vehicle seat back opposed seat frame members, and a first tether second connector and a second tether second connector to a second one of the vehicle seat back opposed seat frame members;

positioning a seat back foam member together with the tether assembly between a thoracic region of an occupant of the vehicle seat and individual ones of a seatbelt retractor and a tether retractor;

connecting a headrest to the seat back having a first headrest post and a second headrest post allowing upward and downward motion of the headrest;

positioning the headrest, the first headrest post and the second headrest post rearward of the tether assembly;

fixing the first tether to the third tether using a first connecting end of the third tether, and coupling the second tether to the third tether using a second connecting end of the third tether.

2. A thoracic region support for an occupant of a vehicle seat, comprising:

a tether assembly having a first tether oriented substantially parallel to a second tether, and a third tether vertically positioned between the first tether and the second tether fixedly coupling the first tether to the second tether;

a first tether first connector and a second tether first connector coupled to a first one of a vehicle seat back opposed seat frame members, and a first tether second connector and a second tether second connector coupled to a second one of the vehicle seat back opposed seat frame members;

a seat back foam member together with the tether assembly disposed between a thoracic region of an occupant of the vehicle seat and individual ones of a seatbelt retractor and a tether retractor;

a headrest connected to the seat back having a first headrest post and a second headrest post allowing upward and downward motion of the headrest, wherein the headrest, the first headrest post and the second headrest post are disposed rearward of the tether assembly, wherein the first tether is connected to the third tether using a first connecting distal end of the third tether, and the second tether is connected to the third tether using a second connecting distal end of the third tether.

3. The thoracic region support of claim 2, wherein the first tether first connector and the second tether first connector individually define a sewn seam.

4. The thoracic region support of claim 2, wherein the first tether first connector and the second tether first connector each define a mechanical connector.

5. The thoracic region support of claim 2, wherein the first tether and the second tether are horizontally configured.

6. The thoracic region support of claim 2, including a polymeric seat belt material used to construct the first tether, the second tether and the third tether.

7. The thoracic region support of claim 2, wherein the first tether, the second tether and the third tether have a width of approximately 2 inches (5.1 cm).

* * * * *